(12) United States Patent
Kim et al.

(10) Patent No.: US 12,526,177 B2
(45) Date of Patent: Jan. 13, 2026

(54) EQUALIZER INCLUDING AN AMPLIFYING ADDER AND RECEIVER COMPRISING THE EQUALIZER

(71) Applicant: Seoul National University R&DB Foundation, Seoul (KR)

(72) Inventors: Jaeyoon Kim, Seoul (KR); Hyunkyu Park, Seoul (KR); Suhwan Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 320 days.

(21) Appl. No.: 18/351,366

(22) Filed: Jul. 12, 2023

(65) Prior Publication Data

US 2024/0223417 A1    Jul. 4, 2024

(30) Foreign Application Priority Data

Jan. 2, 2023    (KR) ........................ 10-2023-0000059

(51) Int. Cl.
| | |
|---|---|
| *H04L 27/01* | (2006.01) |
| *H03F 3/45* | (2006.01) |
| *H04L 25/02* | (2006.01) |
| *H04L 25/03* | (2006.01) |

(52) U.S. Cl.
CPC ......... *H04L 27/01* (2013.01); *H03F 3/45475* (2013.01); *H04L 25/0272* (2013.01); *H04L 25/03057* (2013.01)

(58) Field of Classification Search
CPC ................ H04L 27/01; H04L 25/0272; H04L 25/03057; H04L 25/03878; H04L 25/03267; H04L 25/4917; H03F 3/45475

USPC .......................................................... 375/229
See application file for complete search history.

(56) References Cited

U.S. PATENT DOCUMENTS

| | | |
|---|---|---|
| 9,491,009 B1 | 11/2016 | Vareljian et al. |
| 2004/0234014 A1 | 11/2004 | Chen |
| 2005/0069067 A1 | 3/2005 | Zerbe et al. |
| 2005/0218986 A1 | 10/2005 | Garlepp et al. |
| 2010/0008414 A1 | 1/2010 | Lee et al. |
| 2016/0380784 A1 | 12/2016 | Dallaire et al. |

(Continued)

FOREIGN PATENT DOCUMENTS

| | | |
|---|---|---|
| JP | 7021277 B2 | 2/2022 |
| KR | 1020080097535 A | 11/2008 |

(Continued)

OTHER PUBLICATIONS

Ashkan Roshan-Zamir et al., A 56-GB/s PAM4 Receiver With Low-Overhead Techniques for Threshold and Edge-Based DFE FIR- and IIR-Tap Adaptation in 65-nm CMOS, IEEE Journal of Solid-State Circuits, vol. 54, No. 3, Mar. 2019, pp. 672-684.

(Continued)

*Primary Examiner* — Fitwi Y Hailegiorgis
(74) *Attorney, Agent, or Firm* — WILLIAM PARK AND ASSOCIATES LTD.

(57) ABSTRACT

An equalizer includes an amplifying adder configured to generate an output signal by operating differential input signals and a signal generated by applying an equalization coefficient to a post data signal; and a comparator configured to generate a current data signal by sampling the output signal according to a clock signal, wherein the amplifying adder has a maximum gain when a difference of the differential input signals is within a predetermined range.

11 Claims, 4 Drawing Sheets

(56) References Cited

U.S. PATENT DOCUMENTS

| | | |
|---|---|---|
| 2022/0300188 A1 | 9/2022 | Karim |
| 2023/0246886 A1* | 8/2023 | Kim .................. H04L 27/38 |
| | | 375/233 |

FOREIGN PATENT DOCUMENTS

| | | |
|---|---|---|
| KR | 1020160100722 A | 8/2016 |
| KR | 102143952 B1 | 8/2020 |
| KR | 102430572 B1 | 8/2022 |
| KR | 1020220126444 A | 9/2022 |

OTHER PUBLICATIONS

Bram Nauta, A CMOS Transconductance-C Filter Technique for Very High Frequencies, IEEE Journal of Solid-State Circuits, vol. 27, No. 2. Feb. 1992, pp. 142-153.

Guang Zhu et al., A Low-Power PAM4 Receiver Using 1/4-Rate Sampling Decoder with Adaptive Variable-Gain Rectification, Proc. IEEE Asian Solid-State Circuits Conference (A-SSCC), Seoul, Korea, pp. 81-84, Nov. 2017.

Hans Tuinhout et al., Parametric Mismatch Characterization for Mixed-Signal Technologies, IEEE Journal of Solid-State Circuits, vol. 45, No. 9, Sep. 2010, pp. 1687-1696.

Hyunkyu Park et al., A High-Accuracy and Fast-Correction Quadrature Signal Corrector Using an Adaptive Delay Gain Controller for Memory Interfaces, Proc. IEEE Int. Symp. Circuits Syst. (ISCAS), May 2021, pp. 1-5.

Hyunsu Park et al., 30-Gb/s 1.11-pJ/bit Single-Ended PAM-3 Transceiver for High-Speed Memory Links, IEEE Journal of Solid-State Circuits, vol. 56, No. 2, Feb. 2021, pp. 581-590.

Jay Im et al., A 40-to-56 Gb/s PAM-4 Receiver With Ten-Tap Direct Decision-Feedback Equalization in 16-nm FinFET, IEEE Journal of Solid-State Circuits, vol. 52, No. 12, Dec. 2017, pp. 3486-3502.

Joo-Hyung Chae et al., A 10.4-GB/s 1-Tap Decision Feedback Equalizer With Different Pull-Up and Pull-Down Tap Weights for Asymmetric Memory Interfaces, IEEE Transactions on Circuits and Systems—II: Express Briefs, vol. 67, No. 2, Feb. 2020, pp. 220-224.

Joo-Hyung Chae et al., A Quadrature Clock Corrector for DRAM Interfaces, With a Duty-Cycle and Quadrature Phase Detector Based on a Relaxation Oscillator, IEEE Transactions on Very Large Scale Integration (VLSI) Systems, vol. 27, No. 4, Apr. 2019, pp. 978-982.

Kangyeob Park et al., A 40-GB/s 310-fJ/b Inverter-Based CMOS Optical Receiver Front-End, IEEE Photonics Technology Letters, vol. 27, No. 18, Sep. 15, 2015, pp. 1913-1933.

Keunsoo Song et al., A 1.1 V 2y-nm 4.35 GB/s/pin 8 GB LPDDR4 Mobile Device With Bandwidth Improvement Techniques, IEEE Journal of Solid-State Circuits, vol. 50, No. 8, Aug. 2015, pp. 1945-1959.

Kevin Zheng et al., A 56 GB/s 6 mW 300 um2 inverter-based CTLE for short-reach PAM2 applications in 16 nm CMOS, Proc. IEEE Custom Integr. Circuits Conf. (CICC), Apr. 2018, pp. 1-4.

Kevin Zheng et al., An Inverter-Based Analog Front-End for a 56-Gb/s PAM-4 Wireline Transceiver in 16-nm Cmos, IEEE Solid-State Circuits Letters, vol. 1, No. 12, Dec. 2018, pp. 249-252.

Kuan-Chang Chen et al., A 60-GB/s PAM4 Wireline Receiver With 2-Tap Direct Decision Feedback Equalization Employing Track-and-Regenerate Slicers in 28-nm CMOS, IEEE Journal of Solid-State Circuits, vol. 56, No. 3, Mar. 2021, pp. 750-762.

Kyung-Soo Ha et al., A 7.5 GB/s/pin LPDDR5 Sdram with WCK Clocking and Non-Target ODT for High Speed and with DVFS Internal Data Copy and Deep-Sleep Mode for Low Power, IEEE International Solid-State Circuits Conference (ISSCC) Digest of Technical Papers, pp. 378-380, Feb. 2019.

Liangxiao Tang et al., A 32Gb/s 133mW PAM-4 Transceiver with DFE Based on Adaptive Clock Phase and Threshold Voltage in 65nm CMOS, 2018 IEEE International Solid-State Circuits Conference (ISSCC) Digest of Technical Papers, pp. 114-116, Feb. 2018.

Po-Wei Chiu et al., A 32 GB/s Digital-Intensive Single-Ended PAM-4 Transceiver for High-Speed Memory Interfaces Featuring a 2-Tap Time-Based Decision Feedback Equalizer and an In-Situ Channel-Loss Monitor, IEEE International Solid-State Circuits Conference (ISSCC) Session 22 / DRAM & High-Speed Interfaces / 22.4, Dig. Tech. Papers, pp. 336-338, Feb. 2020.

Thomas Toifl et al., A 22-GB/s PAM-4 Receiver in 90-nm CMOS SOI Technology, IEEE Journal of Solid-State Circuits, vol. 41, No. 4, Apr. 2006, pp. 954-965.

Timothy M. Hollis et al., 25.3 An 8Gb GDDR6X Dram Achieving 22Gb/s/pin with Single-Ended PAM4 Signaling, 2021 IEEE 31-5 Jan. 2, 2023 International Solid-State Circuits Conference (ISSCC), Feb. 18, 2021, pp. 348-350, doi: 10.1109/ISSCC42613.2021. 9365925.

Timothy M. Hollis et al., An 8-GB GDDR6X DRAM Achieving 22 Gb/s/pin With Single-Ended PAM-4 Signaling, IEEE Journal of Solid-State Circuits, vol. 57, No. 1, Jan. 2022, pp. 224-235.

Yong-Un Jeong et al., A 0.64-pJ/Bit 28-GB/s/Pin High-Linearity Single-Ended PAM-4 Transmitter With an Impedance-Matched Driver and Three-Point ZQ Calibration for Memory Interface, IEEE Journal of Solid-State Circuits, vol. 56, No. 4, Apr. 2021, pp. 1278-1287.

* cited by examiner

EQUALIZER INCLUDING AN AMPLIFYING ADDER AND RECEIVER COMPRISING THE EQUALIZER

CROSS-REFERENCE TO RELATED APPLICATIONS

This application claims priority under 35 U.S.C. § 119(a) to Korean Patent Application No. 10-2023-0000059, filed on Jan. 2, 2023, in the Korean Intellectual Property Office, which is incorporated herein by reference in its entirety.

BACKGROUND

1. Technical Field

Various embodiments generally relate to an equalizer and a receiver including the same, and more particularly, to an equalizer including an amplifying adder and a receiver including the same.

2. Related Art

As the data rate increases, a four-level pulse amplitude modulation (PAM-4) technique capable of transmitting multi-level data per channel is used instead of the non-return-to-zero (NRZ) technique.

A receiver uses an equalizer to improve quality of a received signal. For example, a decision feedback equalizer (DFE) improves signal quality by adding a value obtained by multiplying previous data by a coefficient to an input signal.

At this time, an operation of determining a value of the previous data must be completed within one unit interval (UI). In order for a comparator to determine the value the previous data, a swing amplitude of the input signal is required to a certain degree or more, and when the data rate increases, the required swing amplitude generally increases.

In the case of the PAM-4 signal, an eye size is reduced by ⅓ compared to the NRZ signal, and an overall signal quality is determined by the smallest eye.

In order to prevent this, conventionally, efforts have been made to maintain the linearity of the signal to equalize the size of the eye, and thus the swing amplitude of the signal input to the comparator is limited.

Accordingly, the problem was solved in the direction of improving the performance of the comparator. As the performance of the comparator is advanced, the power consumption increases. In the case of a receiver receiving a PAM-4 signal, three or more comparators must be used, so power consumption increases further.

SUMMARY

In accordance with the present teachings, an equalizer may include an amplifying adder configured to generate an output signal by operating differential input signals and a signal generated by applying an equalization coefficient to a post data signal; and a comparator configured to generate a current data signal by sampling the output signal according to a clock signal, wherein the amplifying adder has a maximum gain when a difference of the differential input signals is within a predetermined range.

In accordance with the present teachings, a receiver receiving a multi-level input data signal may include a first data receiving circuit configured to generate a first data signal to determine a first level and a second level according to an input data signal and a first reference voltage; a second data receiving circuit configured to generate a second data signal to determine the second level and a third level according to the input data signal and a second reference voltage greater that the first reference voltage; and a clock receiving circuit configured to generate a clock signal from an input clock signal, wherein the first data receiving circuit includes an amplifying adder configured to generate a first output signal by operating first differential input signals generated from the input data signal and a signal generated by applying an equalization coefficient to a first post data signal of the first data signal; and a comparator configured to generate the first data signal by sampling the first output signal according to a clock signal, wherein the amplifying adder has a maximum gain when a difference of the first differential input signals is within a predetermined range.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing embodiments consistent with this disclosure. The examples of the embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined only in accordance with the presented claims and equivalents thereof.

Figure 1:
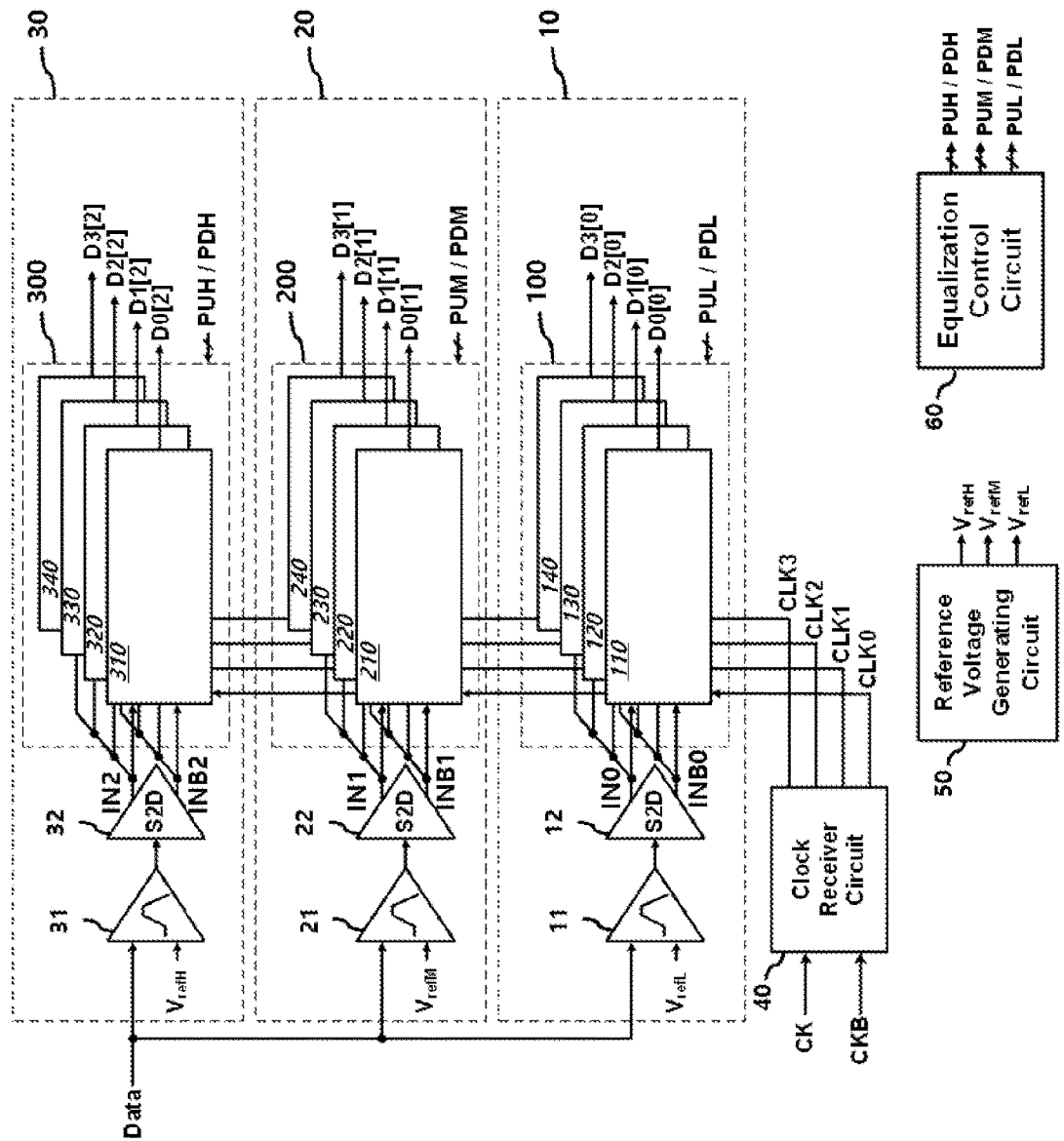
FIG. 1 illustrates a receiver including an equalizer according to an embodiment of the present disclosure.

FIG. 1 is a block diagram showing a receiver 1 including an equalizer according to an embodiment of the present disclosure.

In this embodiment, the receiver 1 receives an input clock signal CK and an input data signal Data.

In this embodiment, the input data signal Data is a four-level pulse amplitude modulation (PAM-4) signal and includes four data levels, which can be indicated as level 0, level 1, level 2, and level 3 in the increasing order of magnitude. The level 0, level 1, level 2, and level 3 may be represented as a first level, a second level, a third level, and a fourth level, respectively.

In this embodiment, a first reference voltage $V_{refL}$ is used to distinguish between the level 0 and the level 1, a second reference voltage $V_{refM}$ is used to distinguish between the level 1 and the level 2, and the third reference voltage $V_{refH}$ is used distinguish between the level 2 and the level 3.

In this embodiment, the receiver 1 includes a first data receiving circuit 10, a second data receiving circuit 20, and a third data receiving circuit 30.

The first data receiving circuit 10 includes a first linear equalizer 11.

The first linear equalizer 11 performs a linear equalization operation on the input data signal Data according to the first reference voltage $V_{refL}$.

Since a linear equalizer performing a linear equalization operation is well known through prior articles such as [T. M. Hollis et al., "25.3 An 8 Gb GDDR6X DRAM Achieving 22 Gb/s/pin with Single-Ended PAM4 Signaling," 2021 IEEE International Solid-State Circuits Conference (ISSCC), 2021, pp. 348-350, doi:10.1109/ISSCC42613.2021.9365925.], a detailed description thereof will be omitted.

In this embodiment, the first data receiving circuit 10 includes a first equalizer 100, and the first equalizer 100 receives differential signals.

At this time, the differential signals input to the first equalizer 100 are referred to as first differential input signals IN0 and INB0.

The output of the first linear equalizer 11 is a single ended signal. The first data receiving circuit 10 further includes a first conversion circuit 12 that converts the output of the first linear equalizer 11 into the first differential input signals IN0 and INB0.

In this embodiment, the first equalizer 100 includes first sub equalizers 110, 120, 130, and 140.

The first sub equalizers 110, 120, 130, and 140 have substantially the same configuration. The first sub equalizers 110, 120, 130, and 140 receive the first differential input signals IN0 and INB0 in common, and generate respective first data signals D0[0], D1[0], D2[0], and D3[0].

The first sub equalizer 110 samples the output of the first conversion circuit 12 according to the first clock signal CLK0 and outputs the first data signal D0[0], the first sub equalizer 120 samples the output of the first conversion circuit 12 according to the second clock signal CLK1 and outputs the first data signal D1[0], and the first sub equalizer 130 samples the output of the first conversion circuit 12 according to the third clock signal CLK2 and outputs the first data signal D2[0], and the first sub equalizer 140 samples the output of the first conversion circuit 12 according to the fourth clock signal CLK3 and outputs the first data signal D3[0].

Feedback coefficients for the first sub equalizers 110, 120, 130, and 140 are controlled according to a first pull-up control signal PUL and a first pull-down control signal PDL. In this case, the first pull-up control signal PUL and the first pull-down control signal PDL may be referred to as equalization coefficients or equalization control signals.

The second data receiving circuit 20 includes a second linear equalizer 21.

The second linear equalizer 21 performs a linear equalization operation on the input data signal Data according to the second reference voltage $V_{refM}$.

Since a linear equalizer performing a linear equalization operation is well known through prior articles like the first linear equalizer 11, a detailed description of its configuration and operation will be omitted.

In this embodiment, the second data receiving circuit 20 includes a second equalizer 200, and the second equalizer 200 receives differential signals.

At this time, the differential signals input to the second equalizer 200 are referred to as second differential input signals IN1 and INB1.

The output of the second linear equalizer 21 is a single ended signal. The second data receiving circuit 20 further includes a second conversion circuit 22 that converts the output of the second linear equalizer 21 into the second differential input signals IN1 and INB1.

In this embodiment, the second equalizer 200 includes second sub equalizers 210, 220, 230, and 240.

The second sub equalizers 210, 220, 230, and 240 have substantially the same configuration. The second sub equalizers 210, 220, 230, and 240 receive the second differential input signals IN1 and INB1 in common, and generate respective second data signals D0[1], D1[1], D2[1], and D3[1].

The second sub equalizer 210 samples the output of the second conversion circuit 22 according to the first clock signal CLK0 and outputs the second data signal D0[1], the second sub equalizer 220 samples the output of the second conversion circuit 22 according to the second clock signal CLK1 and outputs the second data signal D1[1], and the second sub equalizer 230 samples the output of the second conversion circuit 22 according to the third clock signal CLK2 and outputs the second data signal D2[1], and the second sub equalizer 240 samples the output of the second conversion circuit 22 according to the fourth clock signal CLK3 and outputs the second data signal D3[1].

Feedback coefficients for the second sub equalizers 210, 220, 230, and 240 are controlled according to a second pull-up control signal PUM and a second pull-down control signal PDM.

The third data receiving circuit 30 includes a third linear equalizer 31.

The third linear equalizer 31 performs a linear equalization operation on the input data signal Data according to the third reference voltage $V_{refH}$.

Since a linear equalizer performing a linear equalization operation is well known through prior articles like the first linear equalizer 11, a detailed description of its configuration and operation will be omitted.

In this embodiment, the third data receiving circuit 30 includes a third equalizer 300, and the third equalizer 300 receives differential signals.

At this time, the differential signals input to the third equalizer 300 are referred to as third differential input signals IN2 and INB2.

The output of the third linear equalizer 31 is a single ended signal. The third data receiving circuit 30 further includes a third conversion circuit 32 that converts the output of the third linear equalizer 31 into the third differential input signals IN2 and INB2.

In this embodiment, the third equalizer 300 includes third sub equalizers 310, 320, 330, and 340.

The third sub equalizers 310, 320, 330, and 340 have substantially the same configuration. The third sub equalizers 310, 320, 330, and 340 receive the third differential input signals IN2 and INB2 in common, and generate respective third data signals D0[2], D1[2], D2[2], and D3[2].

The third sub equalizer 310 samples the output of the third conversion circuit 32 according to the first clock signal CLK0 and outputs the third data signal D0[2], the third sub equalizer 320 samples the output of the third conversion circuit 32 according to the second clock signal CLK1 and outputs the third data signal D1[2], and the third sub equalizer 330 samples the output of the third conversion circuit 32 according to the third clock signal CLK2 and outputs the third data signal D2[2], and the third sub equalizer 340 samples the output of the third conversion circuit 32 according to the fourth clock signal CLK3 and outputs the third data signal D3[2].

Feedback coefficients of the third sub equalizers 310, 320, 330, and 340 are controlled according to a third pull-up control signal PUH and a third pull-down control signal PDH.

The clock receiving circuit 40 receives the input clock signal CK and generates a four-phase clock signal CLK.

The four-phase clock signal CLK includes the first clock signal CLK0 having a phase of 0 degrees, the second clock signal CLK1 having a phase of 90 degrees, the third clock signal CLK2 having a phase of 180 degrees, and the fourth clock signal CLK3 having a phase of 270 degrees.

Since the configuration and operation of the clock receiving circuit 40 that generates the four-phase clock signal CLK from the input clock signal CK is well known, a detailed description thereof will be omitted.

The receiver 1 further includes a reference voltage generating circuit 50 that generates the first to third reference voltages $V_{refL}$, $V_{refM}$, and $V_{refH}$. The reference voltage generating circuit 50 may generate the first to third reference voltages $V_{refL}$, $V_{refM}$, and $V_{refH}$ through resistance division.

In this embodiment, the first equalizer 100, the second equalizer 200, and the third equalizer 300 are decision feedback equalizers (DFEs).

The receiver 1 further includes an equalization control circuit 60 for adjusting equalization coefficients used in the first equalizer 100, the second equalizer 200, and the third equalizer 300.

The equalization control circuit 60 generates the first pull-up control signal PUL and the first pull-down control signal PDL that are provided to the first equalizer 100, generates the second pull-up control signal PUM the second pull-down control signal PDM that are provided to the second equalizer 200, and generates the third pull-up control signal PUH and the third pull-down control signal PDH that are provided to the third equalizer 300.

In this embodiment, the first to third pull-up control signals and the first to third pull-down control signals are multi-bit signals, respectively.

Because a conventional technique may be applied for adjusting equalization coefficients required during the operation of the decision-feedback equalizer, a detailed description of the configuration and operation of the equalization control circuit 60 will be omitted.

In this embodiment, the first equalizer 100, the second equalizer 200, and the third equalizer 300 have substantially the same configuration and similar operation methods.

Figure 2:
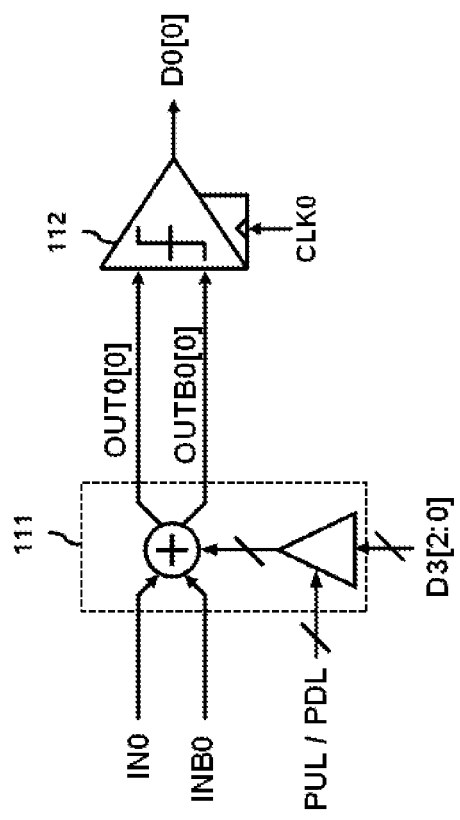
FIG. 2 illustrates a sub equalizer according to an embodiment of the present disclosure.

FIG. 2 is a circuit diagram showing the first sub equalizer 110.

The first to third sub equalizers included in the first equalizer 100, the second equalizer 200, and the third equalizer 300 have the same configuration except input and output signals thereof.

Accordingly, the first sub equalizer 110 may be referred to as a sub equalizer 110 hereinafter.

The sub equalizer 110 includes an amplifying adder 111 and a comparator 112.

The amplifying adder 111 amplifies the first differential input signals IN0 and INB0 to generate first differential output signals OUT0 and OUTB0.

At this time, a post cursor signal D3[2:0] is reflected according to the first pull-up control signal PUL and the first pull-down control signal PDL to generate the first differential output signals OUT0[0] and OUTB0[0]. The post cursor signal may be represented as post signal, post data, or post data signal hereinafter.

The comparator 112 samples a difference between the first differential output signals OUT0[0] and OUTB0[0] according to the first clock signal CLK0 and outputs the first data signal D0[0].

The first differential input signals IN0 and INB0 input to the first sub equalizer 110 are differential signals centered on the first common voltage $V_{THL}$ and can be expressed as Equation 1.

$$IN0 = V_{THL} + \Delta V, \ INB0 = V_{THL} - \Delta V \quad \text{(Equation 1)}$$

At this time, $\Delta V$ is a difference voltage corresponding to half of a difference between the first differential input signals IN0 and INB0.

In this embodiment, the amplifying adder 111 is preferably designed to have the maximum gain when the difference voltage $\Delta V$ is zero.

However, considering a design margin, even if the difference voltage $\Delta V$ is not 0, if the gain of the amplifier can be maximized when the difference voltage $\Delta V$ is within a predetermined range, the above condition can be considered satisfied.

The predetermined range of the difference voltage may be changed according to embodiments, and may be set to be equal to or smaller than, for example, 1%, 3%, 5%, or 10% of the first common voltage $V_{THL}$.

At this time, the predetermined range of the difference voltage may be referred to as the maximum gain range.

Through this, it is possible to maximize the size of the corresponding eye by maximizing the swing amplitude of the first differential output signals OUT0[0] and OUTB0[0].

In this case, since the input margin of the comparator 112 may become sufficiently large, normal operation is possible without complicating the circuit configuration of the comparator 112. Through this, it is possible to reduce the circuit area and power consumption of the comparator 112 compared to the prior art.

Figure 3:
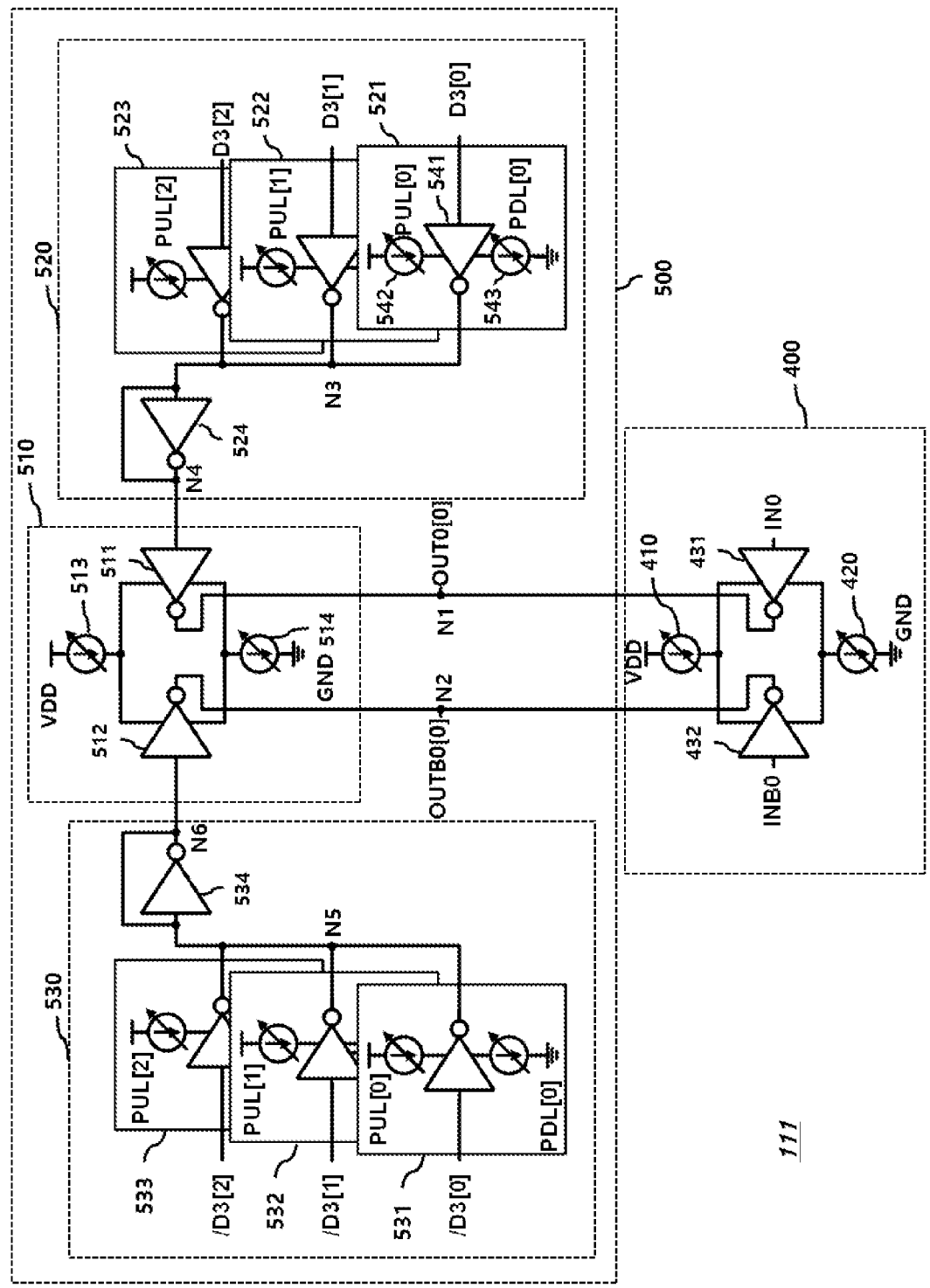
FIG. 3 illustrates an amplifying adder according to an embodiment of the present disclosure.

FIG. 3 is a circuit diagram showing the amplifying adder 111 according to an embodiment of the present disclosure.

In this embodiment, the amplifying adder 111 includes a main amplifier circuit 400 and a post signal addition circuit 500.

The main amplifier circuit 400 amplifies the difference between the first differential input signals IN0 and INB0 to generate the first differential output signals OUT0[0] and OUTB0[0].

The main amplifier circuit 400 includes a first input inverter 431 receiving the first differential input signal IN0 and outputting the first differential output signal OUT0[0] at the first node N1, and a second input inverter 432 receiving the first differential input signal INB0 and outputting the first differential output signal OUTB0[0] at the second node N2.

The main amplifier circuit 400 includes a first current source 410 connected between the first power supply VDD and the first input inverter 431 and the second input inverter 432 to provide a bias current, and a second current source 420 connected between the first input inverter 431 and the second input inverter 432 and a second power supply GND to provide a bias current.

Figure 4:
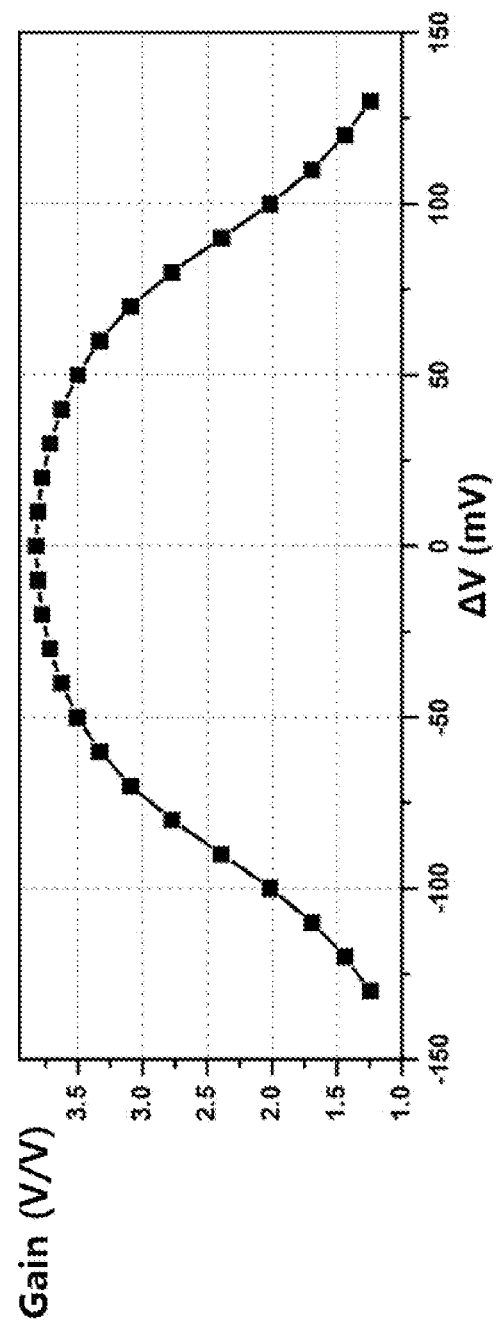
FIG. 4 illustrates a gain characteristics of a main amplifier circuit according to an embodiment of the present disclosure.

As shown in FIG. 4, the main amplifier circuit 400 maximizes the gain when the difference between the first differential input signals IN0 and INB0 is 0, that is, $\Delta V=0$.

To this end, the sizes of the bias currents of the first current source 410 and the second current source 420 and the sizes of the first input inverter 431 and the second input inverter 432 may be adjusted, which are design changes obvious to a person of skilled in the related art.

The post signal addition circuit 500 includes a sub amplifier circuit 510 connected in parallel with the main amplifier circuit 400.

The sub amplifier circuit 510 is connected between a third input inverter 511, a fourth input inverter 512, a third current source 513 connected between the first power supply VDD and the third input inverter 511 and the fourth input inverter 512 to provide a bias current, and a fourth current source 514 connected between the third input inverter 511 and the fourth input inverter 512 and the second power supply (GND) to provide bias current.

The post signal addition circuit 500 further includes a first post signal input circuit 520 and a second post signal input circuit 530.

The first post signal input circuit 520 includes a plurality of first sub post signal input circuit 521, 522, and 523. The first sub post signal input circuit 521 adjusts the post data signal D3[0] according to the first pull-up control signal PUL[0] and the first pull-down control signal PDL[0], and outputs a signal to the third node N3. The first sub post signal input circuit 522 adjusts the post data signal D3[1] according to the first pull-up control signal PUL[1] and the first pull-down control signal PDL[1], and outputs a signal to the third node N3. The first sub post signal input circuit 523 adjusts the post data signal D3[2] according to the first pull-up control signal PUL[2] and the first pull-down control signal PDL[2], and outputs a signal to the third node N3.

The first sub post signal input circuit 521 includes an inverter 541 receiving the post data signal D3[0] and outputting an inverted signal to the third node N3, a current source 542 being connected between the first power source VDD and the inverter 541 and providing a bias current whose magnitude is controlled according to the first pull-up control signal PUL[0], and a current source 543 being connected between the inverter 541 and the second power supply GND and providing a bias current whose magnitude is controlled according to the first pull-down control signal PDL[0].

Since the first sub post signal input circuits 522 and 523 have substantially the same configuration as the first sub post signal input circuits 521, repetitive descriptions thereof are omitted.

The first post signal input circuit 520 further includes an inverter 524 connected between the third node N3 and the fourth node N4.

At this time, the third node N3 and the fourth node N4 are connected in common, and the fourth node N4 is connected to the input terminal of the third input inverter 511.

The second post signal input circuit 530 includes a plurality of second sub post signal input circuit 531, 532, and 533. The second sub post signal input circuit 531 adjusts the post data signal/D3[0] according to the first pull-up control signal PUL[0] and the first pull-down control signal PDL[0], and outputs a signal to the fifth node N5. The second sub post signal input circuit 532 adjusts the post data signal/D3[1] according to the first pull-up control signal PUL[1] and the first pull-down control signal PDL[1], and outputs a signal to the fifth node N5. The second sub post signal input circuit 533 adjusts the post data signal/D3[2] according to the first pull-up control signal PUL[2] and the first pull-down control signal PDL[2], and outputs a signal to the fifth node N5.

Since the second sub post signal input circuits 531, 532, and 533 have substantially the same configuration as the first sub post signal input circuits 521, repetitive descriptions thereof are omitted.

The second post signal input circuit 530 further includes an inverter 534 connected between the fifth node N5 and the sixth node N6.

At this time, the fifth node N5 and the sixth node N6 are connected in common, and the sixth node N6 is connected to the input terminal of the fourth input inverter 512.

FIG. 4 is a graph showing a gain characteristics of the main amplifier circuit 400.

As described above, it is desirable to set the gain of the main amplifier circuit 400 to become maximum when the first differential input signals IN0 and INB0 are equal to the first common voltage $V_{THL}$, that is, when the difference voltage ΔV is 0.

This principle may be applied to the main amplifier circuits included in the first sub equalizers 120, 130, and 140.

Similarly, for main amplifier circuits included in the second sub equalizers 210, 220, 230, and 240, it is preferable that gain is maximized when the second differential input signals IN1 and INB1 are equal to a second common voltage $V_{THM}$.

Similarly, for main amplifier circuits included in the third sub equalizers 310, 320, 330, and 340, it is preferable that gain is maximized when the third differential input signals IN2 and INB2 are equal to a third common voltage $V_{THH}$.

As described above, if there is a point at which the gain is maximized when the differential voltage is included in the maximum gain range in consideration of the design margin, it can be regarded as satisfying the above condition.

Although various embodiments have been described for illustrative purposes, it will be apparent to those skilled in the art that various changes and modifications may be made to the described embodiments without departing from the spirit and scope of the disclosure as defined by the following claims.

What is claimed is:
1. An equalizer comprising:
   an amplifying adder configured to generate an output signal by operating differential input signals and a signal generated by applying an equalization coefficient to a post data signal; and
   a comparator configured to generate a current data signal by sampling the output signal according to a clock signal,
   wherein the amplifying adder has a maximum gain when a difference of the
   differential input signals is within a predetermined range,
   wherein the output signal is differential output signals, and
   wherein the amplifying adder includes:
   a main amplifier circuit configured to amplify the differential input signals and to output the differential output signals at a first node and a second node;
   a first post signal input circuit configured to generate an output by applying an equalization coefficient to the post data signal;
   a second post signal input circuit configured to generate an output by applying an equalization coefficient to an inversion of the post data signal; and
   a sub amplifier circuit configured to output the differential output signals at the first node and the second node by amplifying outputs of the first post signal input circuit and the second post signal input circuit.
2. The equalizer of claim 1, wherein the predetermined range is 1%, 3%, 5%, or 10% of a common voltage of the differential input signals.

3. The equalizer of claim 1, wherein the main amplifier circuit has maximum gain when difference of the differential input signals is within a predetermined range.

4. The equalizer of claim 1, further comprising:
a linear equalizer configured to linearly equalize an input data signal according to one of a first reference voltage, a second reference voltage, and a third reference voltage to determine a level of a four-level pulse amplitude modulation (PAM-4) signal; and
a conversion circuit configured to generate the differential input signals by converting an output of the linear equalizer.

5. A receiver receiving a multi-level input data signal, the receiver comprising:
a first data receiving circuit configured to generate a first data signal to determine a first level and a second level according to an input data signal and a first reference voltage;
a second data receiving circuit configured to generate a second data signal to determine the second level and a third level according to the input data signal and a second reference voltage greater that the first reference voltage; and
a clock receiving circuit configured to generate a clock signal from an input clock signal,
wherein the first data receiving circuit includes:
an amplifying adder configured to generate a first output signal by operating first differential input signals generated from the input data signal and a signal generated by applying an equalization coefficient to a first post data signal of the first data signal; and
a comparator configured to generate the first data signal by sampling the first output signal according to a clock signal,
wherein the amplifying adder has a maximum gain when a difference of the first differential input signals is within a predetermined range.

6. The receiver of claim 5, wherein the predetermined range is 1%, 3%, 5%, or 10% of a common voltage of the first differential input signals.

7. The receiver of claim 5, wherein the first output signal is first
differential output signals, and
wherein the amplifying adder includes:
a main amplifier circuit configured to amplify the first differential input signals and to output the first differential output signals at the first node and the second node;
a first post signal input circuit configured to generate an output by applying an equalization coefficient to the first post data signal;
a second post signal input circuit configured to generate an output by applying an equalization coefficient to an inversion of the first post data signal; and
a sub amplifier circuit configured to output the first differential output signals at the first node and the second node by amplifying outputs of the first post signal input circuit and the second post signal input circuit.

8. The receiver of claim 7, wherein the main amplifier circuit has a maximum gain when a difference of the first differential input signals is within a predetermined range.

9. The receiver of claim 5, wherein the first data receiving circuit includes:
a first linear equalizer configured to linearly equalize the input data signal according to the first reference voltage; and
a first conversion circuit configured to generate the first differential input signals by converting an output of the first linear equalizer.

10. The receiver of claim 5, wherein the second data receiving circuit further includes:
an amplifying adder configured to generate a second output signal by operating second differential input signals generated from the input data signal and a signal generated by applying an equalization coefficient to a second post data signal of the second data signal; and
a comparator configured to generate the second data signal by sampling the second output signal according to the clock signal,
wherein the second input signal is second differential input signals, and
wherein the amplifying adder has a maximum gain when a difference of the second differential input signals is within a predetermined range.

11. The receiver of claim 10, wherein the second data receiving circuit further includes:
a second linear equalizer configured to linearly equalize the input data signal according to the second reference voltage; and
a second conversion circuit configured to generate the second input signal by converting an output of the second linear equalizer.

* * * * *